(12) United States Patent
Burinskiy et al.

(10) Patent No.: US 7,671,574 B1
(45) Date of Patent: Mar. 2, 2010

(54) GROUND VOLTAGE DROP REDUCTION CIRCUIT FOR A BUCK DC-DC CONVERTER

(75) Inventors: Alexander Burinskiy, San Jose, CA (US); Frank De Stasi, San Leandro, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 310 days.

(21) Appl. No.: 11/755,623

(22) Filed: May 30, 2007

(51) Int. Cl.
*G05F 1/00* (2006.01)
(52) U.S. Cl. ........................... 323/284; 323/271
(58) Field of Classification Search .............. 323/259, 323/222, 282, 284, 290, 247, 328, 344, 271; 363/17, 20, 98, 124, 132; 307/113, 125, 307/126, 130, 131
See application file for complete search history.

(56) References Cited

U.S. PATENT DOCUMENTS

| | | | | |
|---|---|---|---|---|
| 5,410,269 A | * | 4/1995 | Ohie et al. | 327/91 |
| 6,061,258 A | * | 5/2000 | Galbiati et al. | 363/98 |
| 6,871,289 B2 | | 3/2005 | Pullen et al. | |
| 6,927,986 B2 | * | 8/2005 | Nishimaki | 363/26 |
| 7,019,504 B2 | | 3/2006 | Pullen et al. | |
| 7,372,238 B1 | * | 5/2008 | Tomiyoshi | 323/224 |

* cited by examiner

*Primary Examiner*—Jessica Han
*Assistant Examiner*—Emily Pham
(74) *Attorney, Agent, or Firm*—Darby & Darby P.C.; Matthew M. Gaffney

(57) ABSTRACT

A buck DC to DC converter is arranged to more accurately regulate an output voltage by substantially eliminating a ground voltage error caused at least in part by parasitic resistance during low side conversion/regulation. During high side conduction of the high side switch, the converter employs the output voltage for error correction. And during low side conduction of the low side switch, the converter employs a sampled and held version of the output voltage for error correction which enables the converter to eliminate the ground voltage error caused by parasitic resistance.

18 Claims, 4 Drawing Sheets

GROUND VOLTAGE DROP REDUCTION CIRCUIT FOR A BUCK DC-DC CONVERTER

FIELD OF THE INVENTION

This invention is directed to electronic regulator circuits, and more particularly to, reducing voltage drop in a buck Direct Current to Direct Current (DC-DC) converter.

BACKGROUND OF THE INVENTION

Since a mobile device is typically powered by a battery, the power consumption efficiency of the device can be a significant consideration in making a purchase. Consequently, many mobile devices employ regulators to accurately and efficiently control the conversion of battery energy into power that can be used by the mobile device. Typical mobile devices can include mobile telephones, pagers, portable game consoles, and personal digital assistants.

In the past, the accuracy of the regulation for direct current to direct current (DC-DC) converters could be adversely affected by a ground voltage drop caused at least in part by parasitic resistances. These parasitic resistances can be present for one or more different reasons, but they are often caused by the arrangement of bond wires and board traces. Also, as the level of the voltage being regulated decreases, an unwanted ground voltage drop can become more significant.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE INVENTION

Figure 1A:
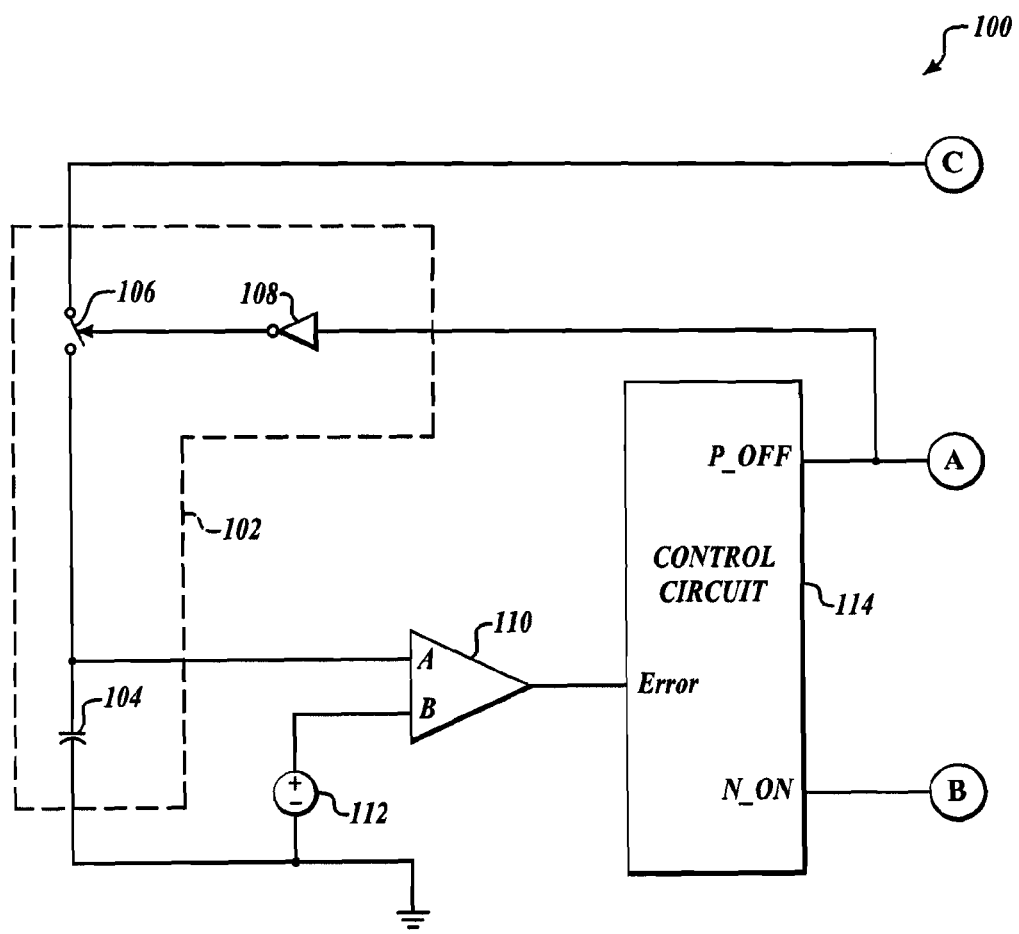
FIGS. 1A and 1B show a schematic diagram for an exemplary buck DC-DC converter with ground voltage drop reduction circuitry.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed to enabling a buck DC to DC converter to accurately regulate an output voltage and substantially eliminate a ground voltage error caused at least in part by parasitic resistance associated with the low side switch path. During operation of the high side switch, the converter samples the output voltage. And during operation of the low side switch, the converter employs a sampled and held version of the output voltage for error correction to eliminate the ground voltage error caused by parasitic resistance.

In at least one embodiment, the DC energy source can be a battery, and the like. Also, depending on the output voltage and/or decay in the input voltage provided by the DC energy source, the duty cycle for high side and low side switches may be significantly asymmetric and still comport with the novel aspects of the invention. Additionally, in at least one embodiment, a substantial portion of the parasitic resistance can be formed by the arrangement of bond wires and board traces.

In at least one embodiment, the high side regulation of the output voltage is enabled by the conduction of at least one PMOS transistor and the low side regulation is enabled by the conduction of an NMOS transistor. Also, in at least one embodiment, the sample and hold circuitry for the output voltage is performed with a MOS based transistor arranged to operate as a switch and at least one capacitor for holding and providing a sampling of the output voltage during the low side switch conduction time. Furthermore, in at least one embodiment, at least one inverter can be arranged to indicate that the PMOS transistor is no longer conducting and also enable at least one capacitor to provide the sampled output voltage for error correction.

Figure 1B:
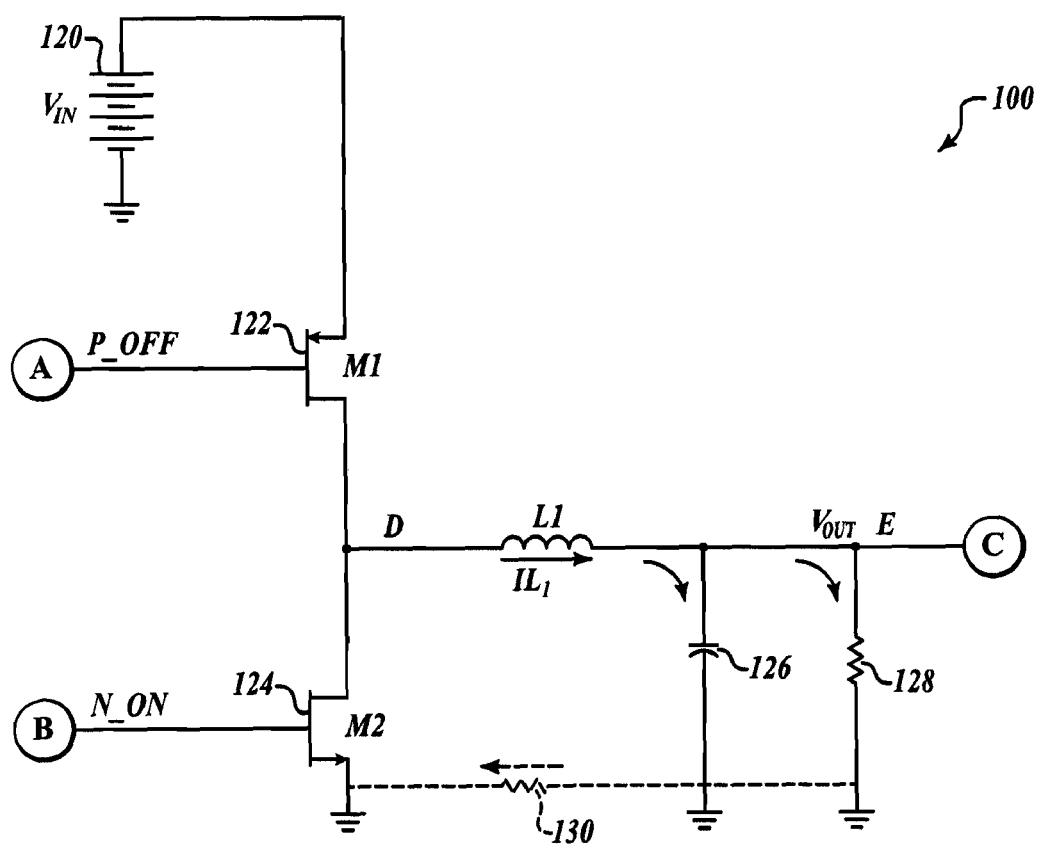

FIGS. 1A and 1B illustrate a schematic diagram for novel buck DC to DC converter 100 that provides for improved output voltage regulation by substantially eliminating a ground voltage drop error caused by parasitic resistance during conduction of the low side switch.

As shown, control circuitry 114 provides P_Off control signal to the gate terminal of PMOS transistor M1, the control circuitry further provides N_On control signal to the gate terminal of NMOS transistor M2. Also, control circuitry 114 is arranged to change the duty cycle of high side versus low side switching of M1 and M2. In this way, as the input voltage decays, control circuitry 114 can asymmetrically change the duty cycle of the low side and high side switching to enable the invention to maintain a relatively constant output voltage.

The source terminal of NMOS transistor M2 is coupled to ground, and at Node D, NMOS transistor M2's drain terminal is coupled to the drain terminal of PMOS transistor M1. The source terminal of PMOS transistor M1 is coupled to the input voltage VIN, which is provided by battery 120. Additionally, one end of inductor L1 is coupled to Node D and the other end of inductor L1 is coupled to both the anode of capacitor 126 and one end of resistor 128 at Node E. Further, the cathode of capacitor 126 is coupled to ground, and the other end of resistor 128 is also coupled to ground. Moreover, parasitic resistance 130 (shown in dotted relief) provides a conduction path from the grounded end of transistor 128 and the cathode of capacitor 126 to the source terminal of NMOS transistor M2.

As illustrated in FIG. 1A, sample and hold sub-circuit 102 includes capacitor 104, switch 106 and inverter 108. Also, sample and hold sub-circuit 102 is arranged to sample the output voltage VOUT provided at input A for error amplifier 110 during high side conduction of M1, and subsequently provide a sampled version of output voltage VOUT from capacitor 104 at input A during low side conduction of M2. The anode of capacitor 104 is coupled to input A of error amplifier 110 and one end of switch 106, and the capacitor's cathode is coupled to ground. The other end of switch 106 is coupled to the output voltage VOUT. Further, inverter 108 is coupled between the gate of switch 106 and the control signal P_Off so that if the P_Off signal is asserted, switch 106 opens and causes the sampled output voltage VOUT to be provided at the A input to error amplifier 110.

Additionally, error amplifier 110 is arranged to output an Error signal to an input of control circuitry 114. The Error signal is a representation of the difference between the reference voltage presented at input B and the output voltage VOUT (or sampled VOUT) presented at input A of error amplifier 110. Consequently, as the input voltage (VIN) provided by battery 120 decays, the control circuitry can compensate for this decay by employing the Error signal to change the asymmetric duty cycle for the low side and high side conduction of M2 and M1, respectively In operation, PMOS transistor M1 is arranged to act as a high side switch between the input supply and the inductor and NMOS transistor M2 is arranged to act as a low side switch between the inductor and ground. Also, the voltage drop across parasitic resistance 130 caused by a portion of inductor current IL1 flowing through capacitor 126 and resistor 128 back to source terminal of NMOS transistor M2 during low side regulation (PMOS off and NMOS on) is substantially eliminated by the operation of the sample and hold sub-circuit 102. In this way, the Error signal provided by error amplifier 110 to control circuitry 114 during low side conduction is substantially more accurate, especially at lower output voltages (1-2 volts).

Although the exemplary embodiment shown in FIGS. 1A and 1B show a PMOS transistor arranged for high conduction and an NMOS transistor arranged for low side conduction, the invention is not so constrained. In at least one other embodiment, the arrangement of these MOS transistors may be changed and/or replaced with other types of MOS devices, Bipolar Junction Transistors (BJTs), analog switches, or virtually any other type of switching component, without departing from the spirit and scope of the invention. Similarly, switch 106 can be formed with one or more MOS devices, such as PMOS, NMOS, CMOS, and the like. Also, BJTs, analog switches, or virtually any other switching component, can be employed for use as switch 106, without departing from the spirit and scope of the invention. Additionally, control circuitry 114 can be arranged with one or more MOS, devices, BJTs, analog switches, or virtually any other electronic and/or electric component.

Additionally, although not shown, the exemplary sample and hold sub-circuit could be employed with other types of circuits that provide a sampled version of the output voltage to an error amplifier during conduction of a low side switch, in such a way that the error amplifier provides the error signal to the control circuit based on a comparison to a reference voltage and at least one of the output voltage or the sampled version of the output voltage. These other types of circuits could include, but are not limited to, boost regulation circuits, buck-boost regulation circuits, or the like.

Figure 2:
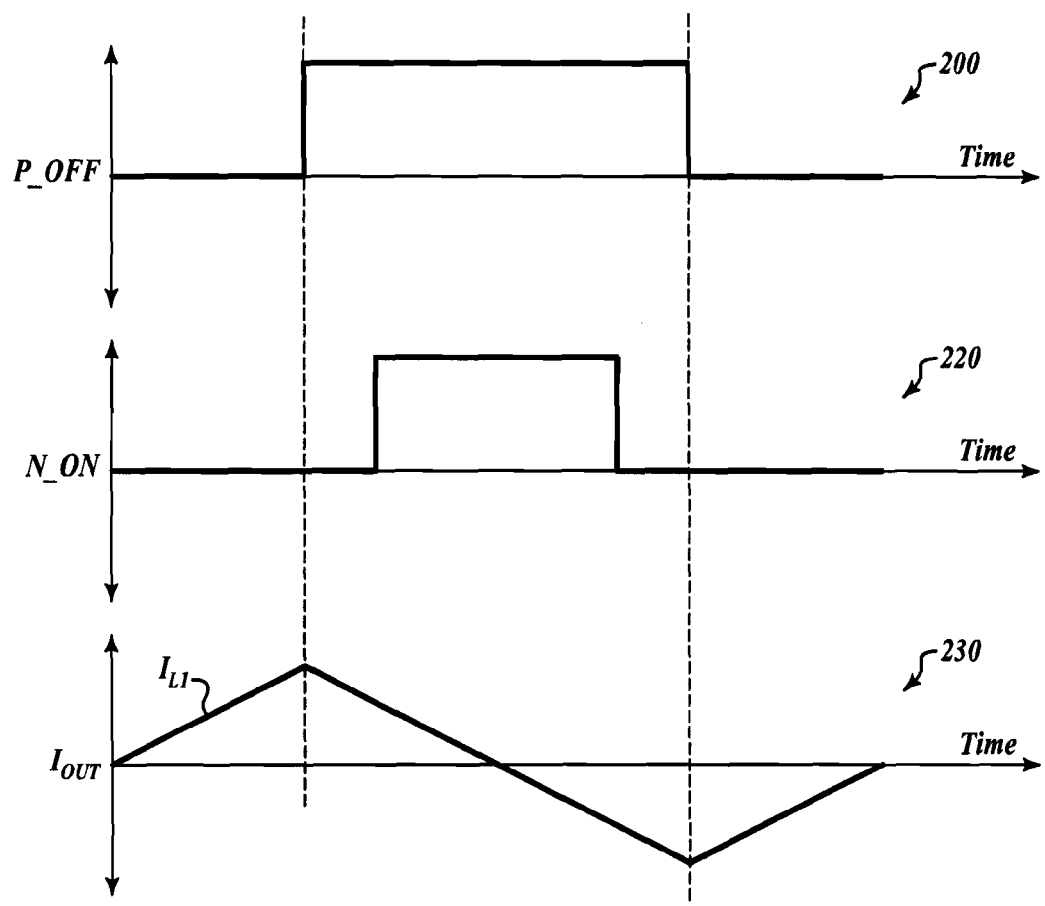
FIG. 2 shows three graphs of the waveforms that correspond to the operation of the exemplary circuitry.

FIG. 2 illustrates three graphs showing the waveforms of the P_Off control signal 200, N_On control signal 220, and the inductor current IL1 230 over time. As shown, once the P_Off control signal is asserted and a PMOS transistor controlling high side conduction is turned off, the N_On control signal turns on and begins the low side conduction phase. Also, as shown, the positively ramping inductor current IL1 peaks at the corner where the P_Off control signal turns on. Next, the inductor current negatively ramps until the P_Off control signal turns off again, and then repeats the same positive ramping.

Figure 3:
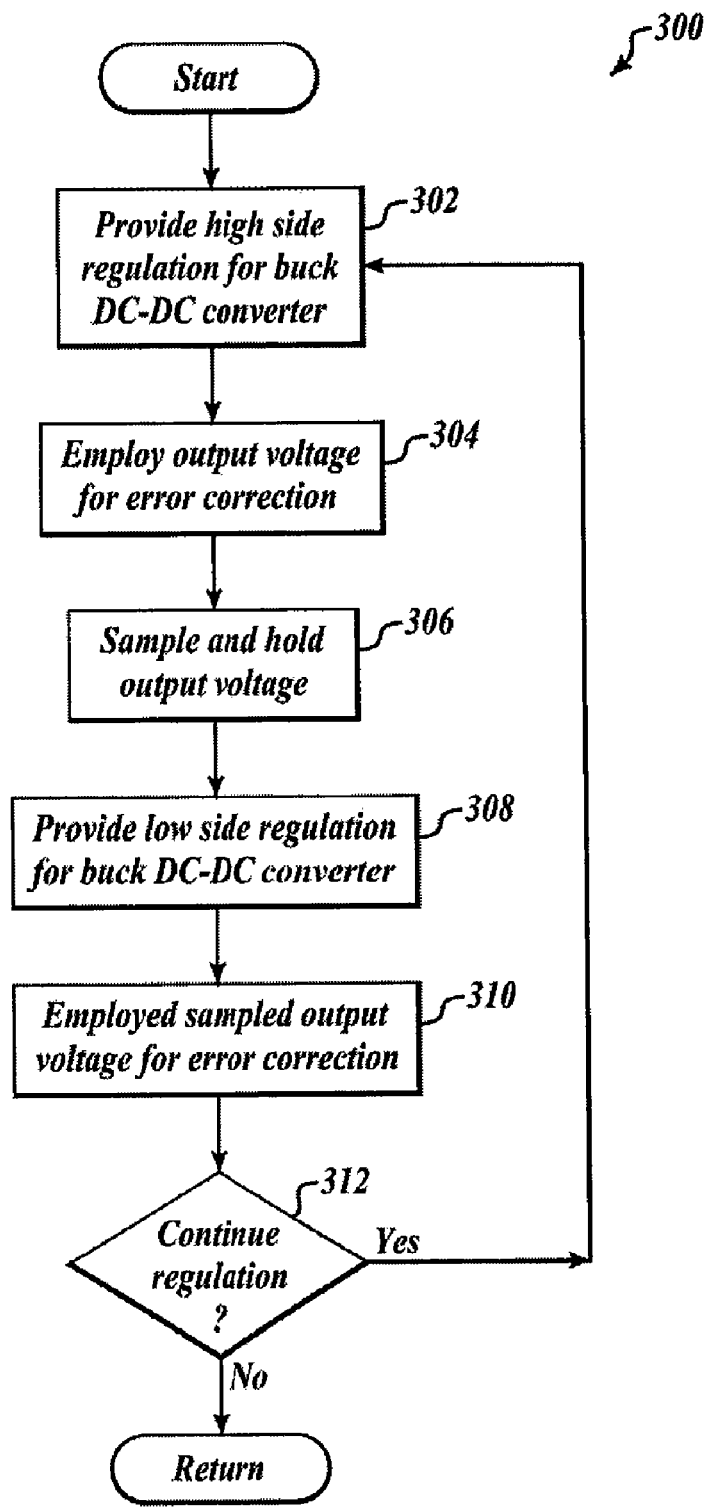
FIG. 3 illustrates a flow chart for regulating the output voltage of a buck DC-DC regulator with reduced error caused by a ground voltage drop in accordance with the invention.

FIG. 3 illustrates a flowchart of process 300 for improving the accuracy of an output voltage generated by a buck DC-DC converter. Moving from a start block, the process steps to block 302 where high side conversion of the input voltage into the output voltage is performed with at least one PMOS transistor. Stepping to block 304, the output voltage is employed for error correction. At block 306, the output voltage is sampled and held.

Advancing to block 308, high side conversion of the input voltage into the output voltage stops and low side conversion of the input voltage is provided by at least one NMOS transistor. Flowing to block 310, the sampled and held output voltage is employed for error correction and regulation of the output voltage during low side conversion of the input voltage.

Next, at decision block 312, a determination is made as to whether or not to continue regulating the output voltage. If the determination is affirmative, the process loops back to block 302 and performs substantially the same actions discussed above again. However, if the determination at decision block 312 is negative, the process stops regulating the output voltage and returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A circuit for regulating an output voltage, comprising:
    a first component arranged for high side conversion of an input voltage into the output voltage;
    a second component arranged for low side conversion of the input voltage into the output voltage;
    a control circuit for regulating the output voltage, wherein the control circuit controls a duty cycle for the high side conversion of the input voltage into the output voltage and the low side conversion of the input voltage into the output voltage, and wherein the duty cycle is based at least in part on an error signal; and
    a sample and hold circuit for providing a sampled version of the output voltage to an error amplifier during low side conversion of the input voltage, wherein the error amplifier provides the error signal to the control circuit based on a comparison to a reference voltage and at least one of the output voltage or the sampled version of the output voltage, and wherein while the first component is off, the sample and hold circuit provides the sampled version of the output voltage for comparison to the reference voltage.

2. The circuit of claim 1, wherein the first component is a PMOS transistor and the second component is an NMOS transistor.

3. The circuit of claim 1, wherein the sample and hold circuit includes at least a switch and a capacitor.

4. The circuit of claim 3, wherein the sample and hold circuit further comprises at least one inverter coupled to a control terminal of the first component, and wherein an off signal provided at the control terminal of the first component causes the switch to open and the capacitor to provide the sampled version of the output voltage for comparison to the reference voltage.

5. The circuit of claim 1, wherein the duty cycle is changed asymmetrically to enable relatively stable regulation of the output voltage over time for a changing input voltage.

6. The circuit of claim 1, wherein the first component provides direct current to direct current (DC-DC) high side conversion of the input voltage into the output voltage, and wherein the second component provides DC-DC low side conversion of the input voltage into the output voltage.

7. The circuit of claim 1, wherein the input voltage is provided by a battery.

8. The circuit of claim 1, further comprising an inductor coupled to the outputs of both the first component and the second component, wherein the inductor provides energy storage during buck regulation.

9. A direct current to direct current (DC-DC) converter circuit for buck regulating an output voltage, comprising:
    a PMOS transistor arranged for high side DC-DC conversion of an input voltage into the output voltage;
    an NMOS transistor arranged for low side DC-DC conversion of the input voltage into the output voltage;
    an inductor coupled to the drains of both the PMOS transistor and the NMOS transistor, wherein the inductor provides energy storage to facilitate the regulation of the output voltage;
    a control circuit for regulating the output voltage, wherein the control circuit is separately coupled to a gate of the PMOS transistor and a gate of the NMOS transistor to control a duty cycle for their conduction during the high side DC-DC conversion of the input voltage and the low side DC-DC conversion of the input voltage, and wherein the duty cycle is based at least in part on an error signal; and
    a sample and hold circuit for providing a sampled version of the output voltage to an error amplifier during conduction of the NMOS transistor, wherein the error amplifier provides the error signal to the control circuit based on a comparison to a reference voltage and at least one of the output voltage or the sampled version of the output voltage, and wherein while the PMOS transistor is off, the sample and hold circuit provides the sampled version of the output voltage for comparison to the reference voltage.

10. The circuit of claim 9, wherein the sample and hold circuit includes at least a switch and a capacitor.

11. The circuit of claim 10, wherein the sample and hold circuit further comprises at least one inverter coupled to the gate of the PMOS transistor, and wherein an off signal provided at the gate of the PMOS transistor causes the switch to open and the capacitor to provide the sampled version of the output voltage for comparison to the reference voltage.

12. The circuit of claim 9, wherein the duty cycle is changed asymmetrically to enable relatively stable regulation of the output voltage over time for a changing input voltage.

13. The circuit of claim 9, wherein the input voltage is provided by a battery.

14. A method for improving the regulation of an output voltage for a regulation circuit, comprising:
    providing high side conversion of an input voltage into the output voltage;
    employing the output voltage for error correction of a duty cycle that regulates the high side conversion of the input voltage into the output voltage;
    sampling and holding the output voltage while high side conversion is occurring;
    providing low side conversion of the input voltage into the output voltage; and
    employing the sampled version of the output voltage for error correction of the duty cycle while low side conversion is occurring.

15. The method of claim 14, wherein the duty cycle is changed asymmetrically to enable relatively stable regulation of the output voltage over time for a changing input voltage.

16. The method of claim 14, wherein the regulation circuit includes at least one of a buck converter, boost converter, or buck-boost converter.

17. The circuit of claim 1, wherein while the first component is on, the output voltage is provided for comparison to the reference voltage and sampled and held by the sample and hold circuit.

18. The circuit of claim 9, wherein while the PMOS transistor is on, the output voltage is provided for comparison to the reference voltage and sampled and held by the sample and hold circuit.

* * * * *